M. M. BEBB.
HEN'S NEST.
APPLICATION FILED DEC. 20, 1916.
1,229,866.
Patented June 12, 1917.
2 SHEETS—SHEET 1.
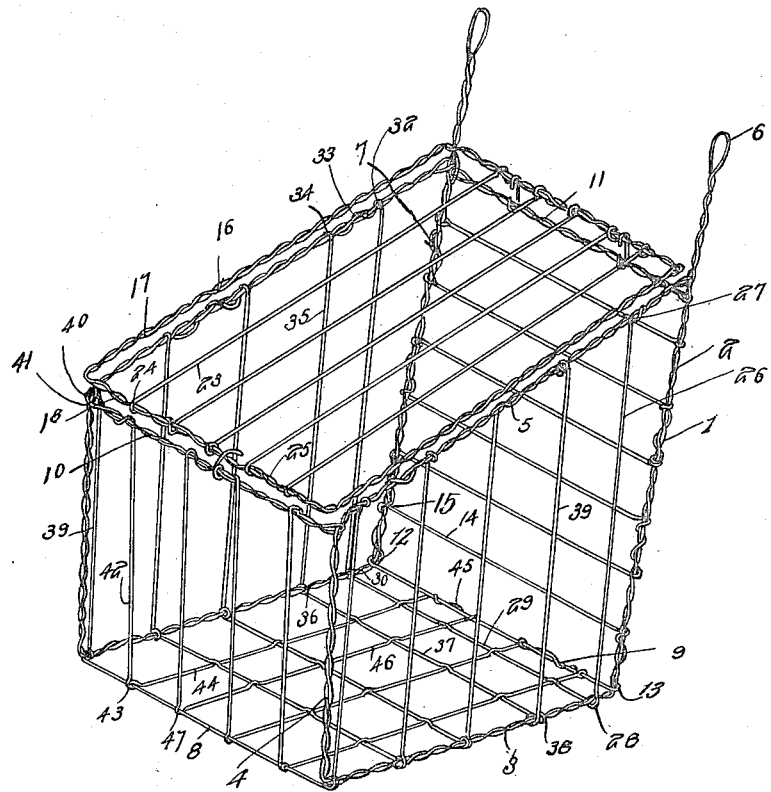
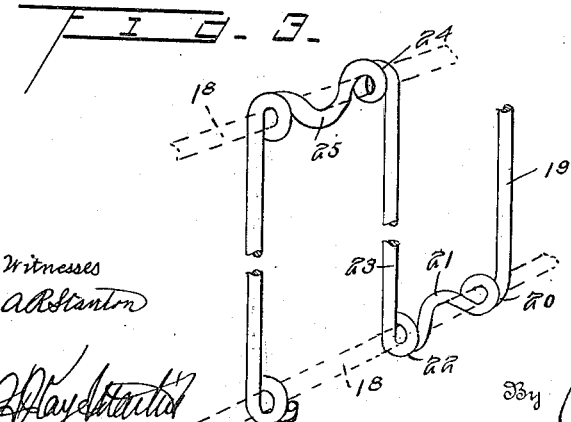
Witnesses
Inventor
M. M. Bebb.
By
Attorney

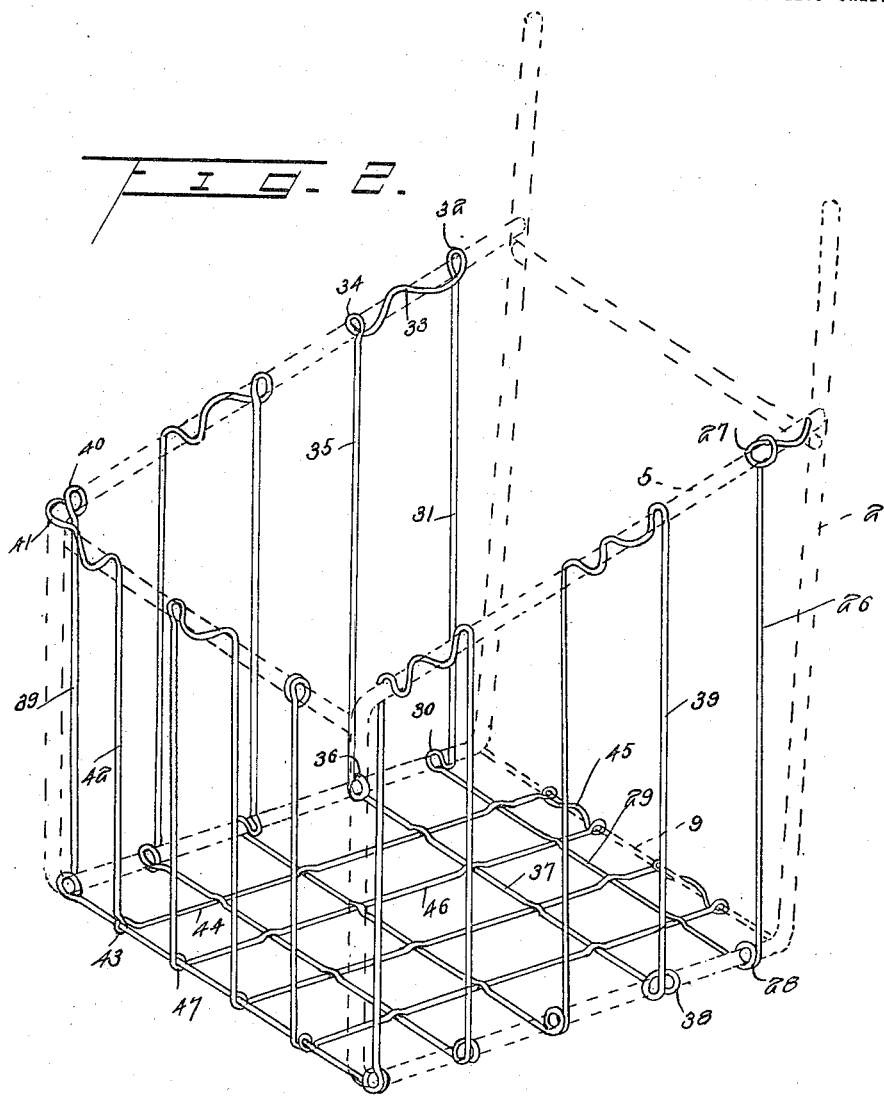

UNITED STATES PATENT OFFICE.

MYRTIE MAY BEBB, OF CARPENTER, WYOMING.

HEN'S NEST.

1,229,866.     Specification of Letters Patent.     Patented June 12, 1917.

Application filed December 20, 1916. Serial No. 138,123.

*To all whom it may concern:*

Be it known that I, MYRTIE M. BEBB, a citizen of the United States, residing at Carpenter, in the county of Laramie and State of Wyoming, have invented certain new and useful Improvements in Hens' Nests; and I do hereby declare the following to be a full, clear, and exact description of the invention, such as will enable others skilled in the art to which it appertains to make and use the same.

This invention relates to new and useful improvements in hens' nests and particularly those made of wire so that the same may be passed through a flame to remove any insect life.

Another object of the invention is to provide a novel means of forming the sides, front and bottom walls of the nest from a single piece of wire.

A still further object of the invention is to provide a novel method of forming the back and top members thus providing a novel form of wire fabric from which nests, baskets and the like can be made.

With these and other objects in view, the invention consists in the novel combination and arrangement of parts which will be fully set forth in the following specification and accompanying drawings, in which:—

Figure 1 is a perspective view of a nest constructed in accordance with this invention, Fig. 2 is a perspective view of the front, bottom and side walls showing the frame in dotted lines to more clearly illustrate the details of construction, and Fig. 3 is a fragmentary perspective view showing the method of forming the back and top of the device.

Referring to the drawings, the numeral 1 designates as an entirety one of the side frames of the nest comprising a substantially vertical rear rod 2 formed of twisted strands of wire. Extending angularly from the bottom or lower end of the rod 2 is the bottom frame bar 3 formed at its forward end with the upstanding bar 4 which is of a length substantially equal to one-half the length of the bar 2 and is formed at its upper end with the upwardly inclined rearwardly extending bar 5 which joins the bar 2 near its upper end. The upper end of the bar 2 is formed with a loop 6 which is adapted to engage over a hook or nail attached to the side of a building. Coöperating with the frame 1 is the frame designated generally by the numeral 7 which corresponds in shape and construction to the frame 1 and connecting the lower forward corners of each frame and the lower rear corners of each frame are suitable bars 8 and 9 respectively. The upper forward corner of each frame is connected to the other by means of a frame bar 10 formed of twisted strands of wire and a similar bar 11 connects the upper rear corner of the frame. After the frames have been constructed and joined by the cross bars, the rear wall is then attached thereto and consists of the bottom bar 9 formed at one end with a loop 12 which bar extends to the vertical bar 2 where it is again looped as at 13 and twisted around the bar 2 of the frame 1 on which it coils upwardly for a short distance and is then again bent outwardly at right angles to said frame to form the bar 14 which extends to the vertical bar of the frame 7 around which it is bent as at 15 and thus the back is formed of a single piece of wire which is bent back and forth across between the two frames forming a series of horizontal bars which are alternately connected to each other at their ends.

In forming the top, the same consists of a frame designated generally by the numeral 16 comprising side and end bars which are designated respectively by the numerals 17 and 18 and these side and end bars of the frame 16 are formed of intertwisted strands of wire while the filler portion is formed of a single wire constructed in a manner similar to the back. For clearness in illustration, the frame bars are shown dotted in Fig. 3 while the wire forming the filler is designated by the numeral 19 and is looped at one end around one of the frame bars 18 near one side of the frame and continues across and is than bent as at 20 around the opposite side of the frame where the same is thus secured in place. The bent portion then continues around as at 21 and terminates in a loop 22 the end of which terminates in a transverse bar 23 which extends to the opposite frame bar and is formed with a loop 24 which terminates in a portion 25 wound around said opposite bar which terminates in a loop and the cross bar as previously described. It will thus be seen that the filler portion of the top is formed of a single piece of wire.

In forming the sides, front and bottom of the device a wire 26 is provided and is formed at its end with a loop 27 which engages around the upper frame bar 5 of the frame 1 adjacent the point where it joins the bar 2. This wire 26 extends downwardly from the loop 27 and is looped about the bottom frame bar 3 as at 28 from which the same passes across to the bottom frame bar 3 of the frame 7 forming the rear bar 29 of the bottom. The bar 29 is formed at its end opposite the loop 28 with a loop 30 which continues upwardly as at 31 forming the rearmost bar of the side wall of the frame 7 and the upper end of the bar 31 is looped as at 32 and then wound about the frame bar 5 of the frame 7 as at 33 and again provided with a loop 34 which terminates in a downwardly extending parallel bar 35 which projects parallel with the bar 31 and is provided at its lower end with a loop 36 which is continued to form the transversely extending bottom bar 37 which projects in a plane parallel with the bar 29 and is provided with a loop 38 which is extended upwardly as at 39 to form a bar extending parallel with the bar 26. It will thus be seen that a continuation of loops is formed which are alternately wrapped about the bars 5 of the frames 1 and 7 until the last of the side bars designated by the numeral 39 is in position. This bar 39 is provided at its upper end with a loop 40 which terminates in a bend 41 which winds about the remaining portion of the side bar 5 of the frame 7 and then partially around the frame bar 10 to a point a short distance from the end of said bar where the wire bends downwardly as at 42 to form a front bar which terminates at its lower end in a loop 43 which in turn is formed with the rearwardly extending bar 44 which is interwoven with the transverse bars 29 and 37 until it reaches the frame bar 9 where it is wound about said bar 45 and then continued forwardly interweaving with the cross bars 29 and 37 as at 46. The bar 46 is then continued forwardly and looped as at 47 upon the forward frame bar and then continued upwardly to form a bar parallel with the bar 42. This process is repeated until the entire bottom and sides have been completed. In this way it will be seen that the bottom and sides of the device are formed of a single piece of wire and any cutting of the wires is eliminated thus also eliminating any sharp ends.

While in the foregoing there has been shown and described the preferred embodiment of the invention, it is to be understood that such changes may be made in the combination and arrangement of parts as will fall within the spirit and scope of the invention as claimed.

What is claimed is:—

A nest comprising a pair of spaced parallel frames, having top, bottom, front and rear bars, the rear bars extending upwardly beyond the top bars, loops formed at the upper ends of the rear bars, transversely extending bars holding the rear bars in spaced parallel relation, a wire connected across between the rear bars of the frames to form a rear panel, a wire connected across the side, bottom and front bars of the frames upon the side, bottom and front panels of the device, and a lid comprising a frame having a filler formed of a single piece of wire extending between the upper and lower bars of the lid.

In testimony whereof I affix my signature in the presence of two witnesses.

MYRTIE MAY BEBB.

Witnesses:
 ANNA JOBBINS,
 E. H. BENEDETT.

Copies of this patent may be obtained for five cents each, by addressing the "Commissioner of Patents, Washington, D. C."